(12) United States Patent
Bastide et al.

(10) Patent No.: US 11,356,398 B2
(45) Date of Patent: Jun. 7, 2022

(54) LENS-FOCUSED CHANNEL PRESENTATION

(71) Applicant: International Business Machines Corporation, Armonk, NY (US)

(72) Inventors: Paul R. Bastide, Ashland, MA (US); Liam S. Harpur, Skerries (IE); Robert E. Loredo, North Miami Beach, FL (US); Matthew E. Broomhall, Goffstown, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

(21) Appl. No.: 16/827,028

(22) Filed: Mar. 23, 2020

(65) Prior Publication Data

US 2021/0297377 A1    Sep. 23, 2021

(51) Int. Cl.
*G06F 40/279* (2020.01)
*H04L 51/00* (2022.01)
*H04L 65/403* (2022.01)

(52) U.S. Cl.
CPC ............ *H04L 51/12* (2013.01); *G06F 40/279* (2020.01); *H04L 65/403* (2013.01)

(58) Field of Classification Search
CPC ..... H04L 51/12; H04L 12/1859; H04L 51/14; H04L 51/32; G06F 40/279; G06N 3/0454; G06N 20/10
USPC ....................................................... 709/206
See application file for complete search history.

(56) References Cited

U.S. PATENT DOCUMENTS

| | | | |
|---|---|---|---|
| 2019/0155954 A1 | 5/2019 | Goyal et al. | |
| 2019/0173812 A1 | 6/2019 | Higgins et al. | |
| 2019/0182062 A1 | 6/2019 | Skiff et al. | |
| 2020/0348828 A1* | 11/2020 | Fay | G06N 20/00 |
| 2021/0029249 A1* | 1/2021 | Erhart | H04L 51/02 |

OTHER PUBLICATIONS

Konstan, J.A. et al., "GroupLens: applying collaborative filtering to Usenet news," Communications of the ACM, vol. 40, No. 3, Mar. 1997, pp. 77-87.
"Inbox by Gmail," [online] Wikipedia, Wikipedia Foundation, Inc., last updated Dec. 13, 2019, [retrieved Dec. 30, 2019], retrieved from the Internet: <https://en.wikipedia.org/w/index.php?title=Inbox_by_Gmail&oldid=930510730>, 5 pg.
"SaneBox," [online] SaneBox, Inc. © Copyright 2019 [retrieved Dec. 30, 2019], retrieved from the Internet: <https://www.sanebox.com/business>, 4 pg.

(Continued)

*Primary Examiner* — Sibte H Bukhari
(74) *Attorney, Agent, or Firm* — Cuenot, Forsythe & Kim, LLC

(57) ABSTRACT

Presenting a lens-focused channel can include determining a state of a separate channel hosted on a data communications network. A topic-specific lens for federating a plurality of topic-specific messages conveyed over the data communications network can be configured in response to a predetermined condition indicated by the state of the channel. A lens-focused channel can be generated for presenting the plurality of topic-specific messages, as federated by the topic-specific lens, to a user over the data communications network.

15 Claims, 6 Drawing Sheets

(56) References Cited

OTHER PUBLICATIONS

Vander Wal, T., "5 Core Insights for Community Platforms Today—Personal InfoCloud," [online] Personal InfoCloud.com, Sep. 27, 2018, retrieved from the Internet: <https://www.personalinfocloud.com/blog/2018/9/27/core-insights-for-community-platforms-today>, 5 pg.
Mell, P. et al., The NIST Definition of Cloud Computing, National Institute of Standards and Technology, U.S. Dept. of Commerce, Special Publication 800-145, Sep. 2011, 7 pg.
Blei, D.M. et al., "Latent Dirichlet Allocation," Journal of Machine Learning Research, vol. 3, Jan. 2003, pp. 993-1022.

* cited by examiner

300

```
┌─────────────────────────────────────────────┐
│ Determine state of a channel hosted on a data│
│         communications network              │
│                   302                        │
└─────────────────────────────────────────────┘
                      │
                      ▼
                 ╱Condition?╲      N
                 ╲   304    ╱─────────┐
                      │               │
                      │ Y             │
                      ▼               │
┌─────────────────────────────────────────────┐
│ Configure a topic-specific lens for federating topic-specific messages │
│      conveyed over the data communications network                     │
│                          306                                           │
└─────────────────────────────────────────────┘
                      │
                      ▼
┌─────────────────────────────────────────────┐
│ Generate a lens-based channel for presenting the plurality of topic-  │
│  specific messages, as federated by the topic-specific lens, to a user │
│                over the data communications network                    │
│                          308                                           │
└─────────────────────────────────────────────┘
                      │
                      ▼
                   ( END )◄────────────┘
```

FIG. 3

LENS-FOCUSED CHANNEL PRESENTATION

BACKGROUND

This disclosure relates to data communications networks, and more particularly, to messaging platforms and collaboration tools.

Information is increasingly exchanged over the Internet and other data communications networks. A wide array of collaborative work environments, online social media, various forms of groupware and electronic messaging platforms enable users to rapidly process and share information in logical and organized ways.

SUMMARY

In one or more embodiments, a method can include determining, with computer hardware, a state of a channel hosted on a data communications network. The method also can include configuring a topic-specific lens for federating a plurality of topic-specific messages conveyed over the data communications network in response to a predetermined condition indicated by the state of the channel. Additionally, the method can include generating a lens-focused channel for presenting the plurality of topic-specific messages, as federated by the topic-specific lens, to a user over the data communications network.

In one or more embodiments, a system includes a processor configured to initiate operations. The operations can include determining a state of a channel hosted on a data communications network. The operations also can include configuring a topic-specific lens for federating a plurality of topic-specific messages conveyed over the data communications network in response to a predetermined condition indicated by the state of the channel. Additionally, the operations can include generating a lens-focused channel for presenting the plurality of topic-specific messages, as federated by the topic-specific lens, to a user over the data communications network.

In one or more embodiments, a computer program product includes one or more computer readable storage media having instructions stored thereon. The instructions are executable by a processor to initiate operations. The operations can include determining a state of a channel hosted on a data communications network. In one or more embodiments, a computer program product includes at least one computer-readable storage medium having instructions stored thereon. The instructions are executable by a processor to initiate operations. The operations also can include configuring a topic-specific lens for federating a plurality of topic-specific messages conveyed over the data communications network in response to a predetermined condition indicated by the state of the channel. Additionally, the operations can include generating a lens-focused channel for presenting the plurality of topic-specific messages, as federated by the topic-specific lens, to a user over the data communications network.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 is a flowchart of an example method of creating a lens-focused channel according to an embodiment.

DETAILED DESCRIPTION

Figure 1:
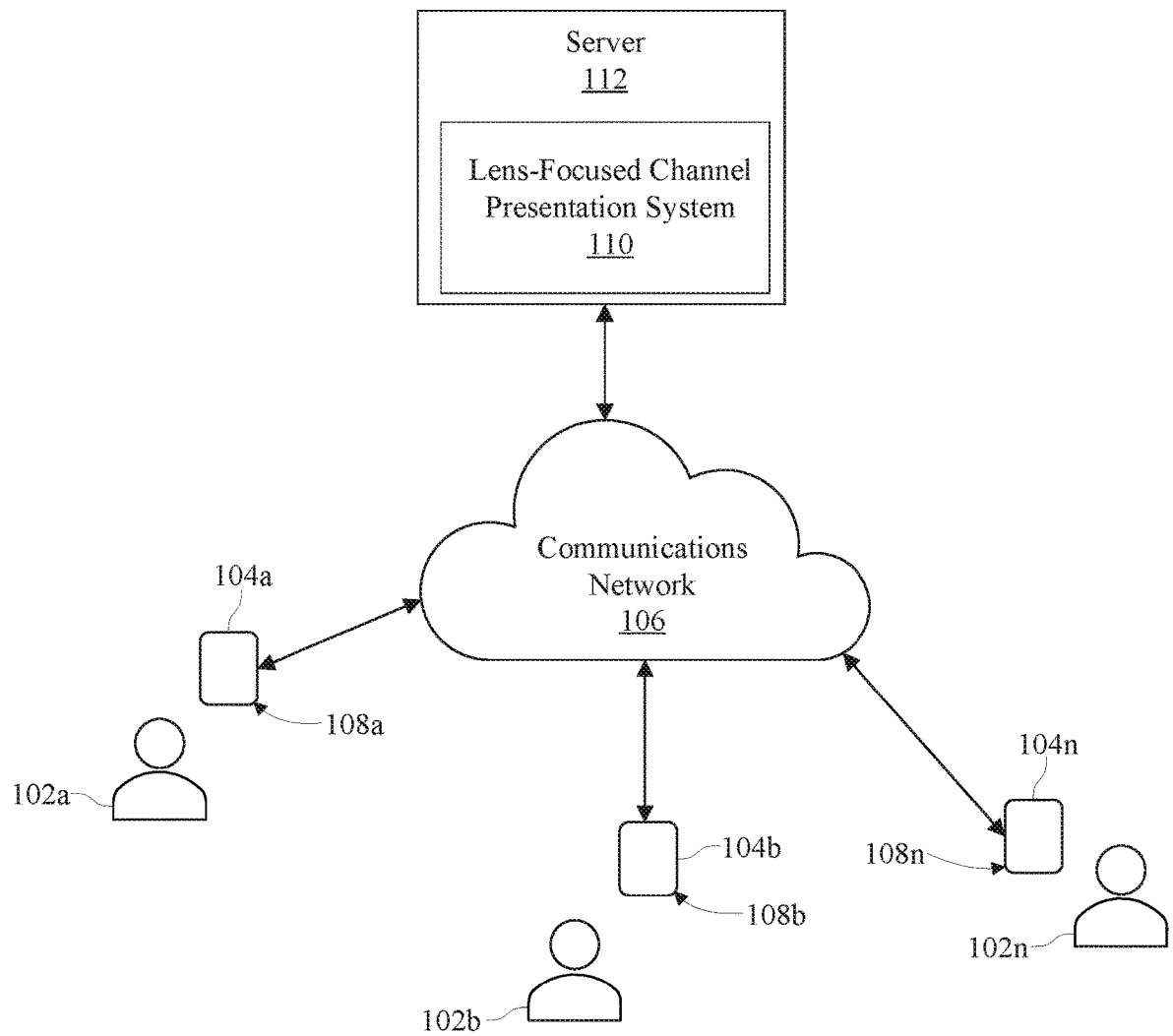
FIG. 1 depicts an example communication network in which a lens-focused channel presentation system is operable according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates data communications networks, and more particularly, to messaging platforms and collaboration tools. Communications and collaborations over a data communications network enable multiple users to collect and share information and to engage in wide-ranging discussions on various topics. One widely used mechanism for group collaboration is the channel—an online session that when established provides an electronic discussion forum which users can join to exchange information and views on one or more specific topics. Messages conveyed over the channel are relayed to all users who have joined the discussion online.

Notwithstanding the efficiencies and convenience afforded by a channel, there are situations in which the channel proves problematic for a user. In some instances, one or more users may blend several channels into a single channel with the result that multiple topics occur within the single channel rather than within each of the distinct channels originally created for each topic. A user may be interested in or need to pay attention to a specific topic among the multiple topics now appearing within the blended channel. There is thus the chance that the user may miss the topic that, though important or urgent to the user, is now obscured among multiple topics. In other instances, messages concerning a single topic that the user is interested in or needs to pay attention to may appear in multiple channels. Especially if the user is inundated with numerous messages on numerous channels, the user may find it difficult to focus on the single topic.

In accordance with the inventive arrangements disclosed herein, the state of a channel hosted on a data communications network can be determined. The state of the channel may reflect a surge in messaging, a high volume of unacted upon messages, or other condition that can create obstacles to a user or group of users appropriately focusing on specific messages pertaining to one or more specific topics that warrant attention ahead of other messages. Responding to the state of the channel, a topic-specific lens can be configured for federating a plurality of topic-specific messages. The topic-specific messages can be extracted from one or more channels and presented in a lens-focused channel. The lens-focused channel enables a user or group of users to focus on one or more topics in a select set of federated messages free of extraneous messages on unrelated topics.

The arrangements described herein are directed to computer technology and provide an improvement to computer technology. Specifically, the present arrangements improve computer technology using machine language, including natural language processing, to identify and federate without human intervention topic-specific messages and to automatically generate a channel for presenting the messages over an electronic communications network unencumbered with unrelated messages.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 depicts communications environment 100, which is an example of a communications environment in which the inventive arrangements may be implemented according to an embodiment. Communications environment 100 illustratively includes multiple users 102a, 102b, and 102n who communicate using electronic devices 104a, 104b, and 104n, respectively. Although only three such users and user devices are shown, it will be readily apparent that communications environment 100 can include more or fewer users and user devices.

Electronic devices 104a-104n can comprise various types of electronic devices, including, for example, a computer (e.g., desktop, laptop, tablet), a smartphone or other mobile device, smart TV, or other communication/computing device. It will be appreciated that in various embodiments one or more of electronic devices 104a-104n can be deployed as a standalone device or deployed as multiple devices in a distributed client-server networked system. For example, in certain embodiments, a smartwatch can operatively couple to a mobile device (e.g., cell phone).

Illustratively, electronic devices 104a-104n communicatively couple with electronic communications network 106. Electronic communications network 106 is a medium that illustratively provides communication links between various devices and data processing systems that are interconnected within communications environment 100. Electronic communications network 106 may include connections, such as wired communication links, wireless communication links, fiber optic cables, or other communication links. Electronic communications network 106 can be implemented as, or include, one or more different communication technologies such as the Internet, a wide area network (WAN), a local area network (LAN), a wireless network (e.g., a wireless WAN and/or a wireless LAN), a mobile or cellular network, a Virtual Private Network (VPN), and so forth.

As defined herein, "communication link" means a mode of communication using one or more electronic devices. A communication link is associated with a specific format and/or communication protocol for sending messages. For example, using a specific format and/or communication protocol, an electronic device can send a message to another electronic device as a text message, an email, and/or a post to a social networking system, team collaboration platform, or other messaging platform. A communication link for exchanging text messages is considered a distinct communication link. Likewise, a communication link for exchanging emails is a distinct communication link. So, too, a communication link used for posting to a social networking system or team collaboration platform is considered a distinct communication link. Accordingly, each type of communication link corresponding to a different type or mode of communication is considered a distinct communication link.

Electronic devices 104a-104n are capable of coupling to network 106 via wired and/or wireless communication links for enabling users 102a-102n to exchange messages with one another. As defined herein, a "message" is any one of a variety of electronic communications that is capable of being sent and/or received through electronic communications network 106. Examples of a message include, but are not limited to, electronic mail (email), instant messages, short message service (SMS) messages, and posts to a Website, a collaboration platform, social networking platform, and/or other messaging platform.

Electronic devices 104a-104n are endowed with processing capabilities and/or circuitry 108a, 108b, and 108, respectively, which enable users 102a-102n to engage in electronic conversations using one or more collaboration platforms, social networking platforms, and/or other messaging platforms communicatively linked via electronic communications network 106. As defined herein, an "electronic conversation" is a series of messages (text) that each relate to a common set (one or more) of topic or concepts identifiable by words, phrases, and/or sentences that comprise the messages. Electronic conversations can occur over channels, such as an Internet Relay Chat discussion forum or other type of group communication channel created using an application-layer protocol, for example. As defined herein, a "channel" is a session established on an electronic communications network that enables multiple users to join and send messages to the channel and that relays messages sent to the channel to all other users joined to the channel.

Communications environment 100 also includes lens-focused channel presentation system 110. Illustratively, lens-focused channel presentation system 110 is implemented in network server 112 (e.g., cloud-based server) which communicatively links to electronic devices 104a-104n via communications network 106. Lens-focused channel presentation system 110 can be integrated in or operatively coupled with a collaboration system, social network, or other messaging platform that enables users 102a-102n to exchange messages via electronic communications network 106 using electronic devices 104a-104n. As defined herein, "messaging platform" includes collaboration platforms, social networking platforms, messaging applications, asynchronous and synchronous conferencing services, and other technologies for exchanging text messages over one or more data communications networks. In certain embodiments, lens-focused channel presentation system 110 can include or operatively couple to a speech-to-text processor for converting vocal utterances conveyed over an electronic communications network. Lens-focused channel presentation 110 thus can perform the same functions and operations with respect to a vocal utterance converted to text as with respect to a message comprising text.

Figure 2:
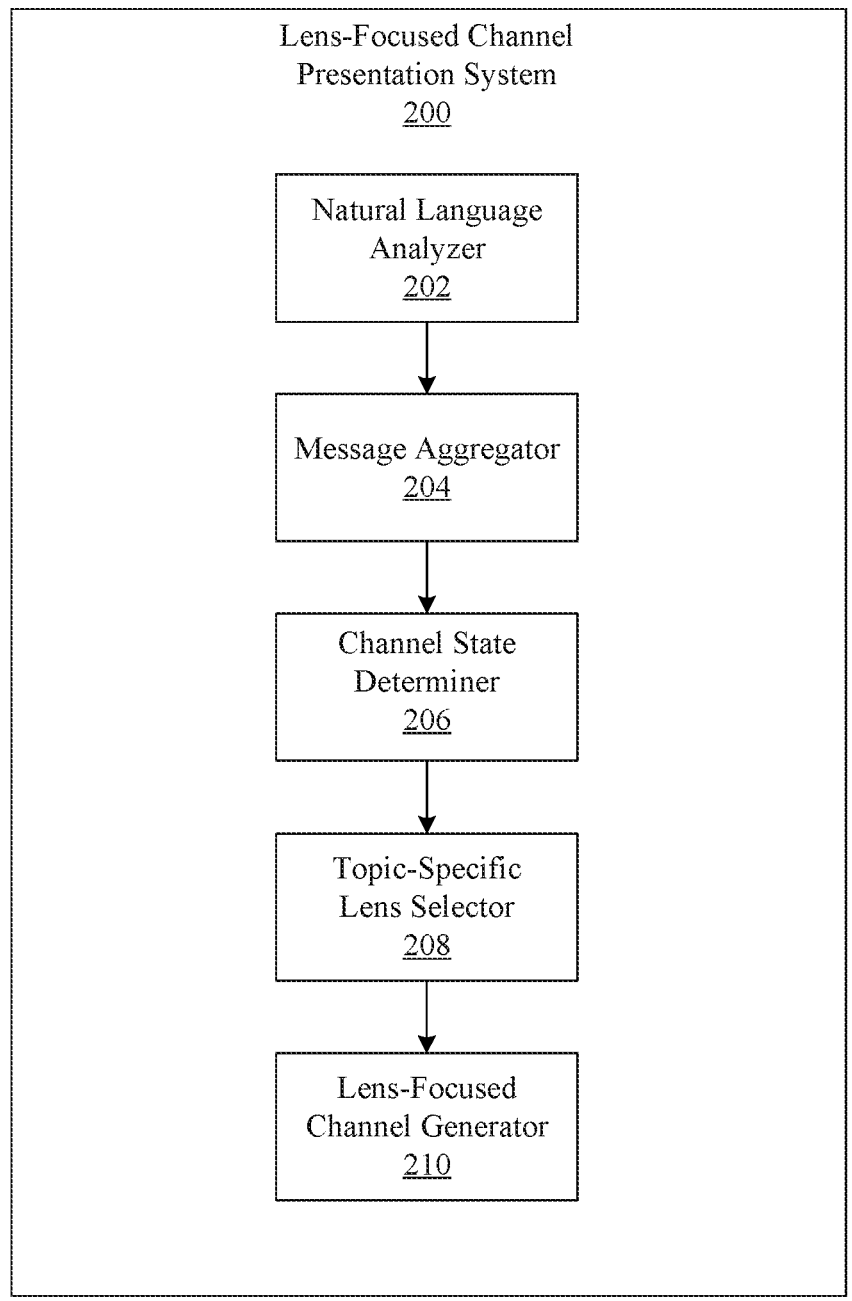
FIG. 2 depicts an example lens-focused channel presentation system according to an embodiment.
Figure 6:
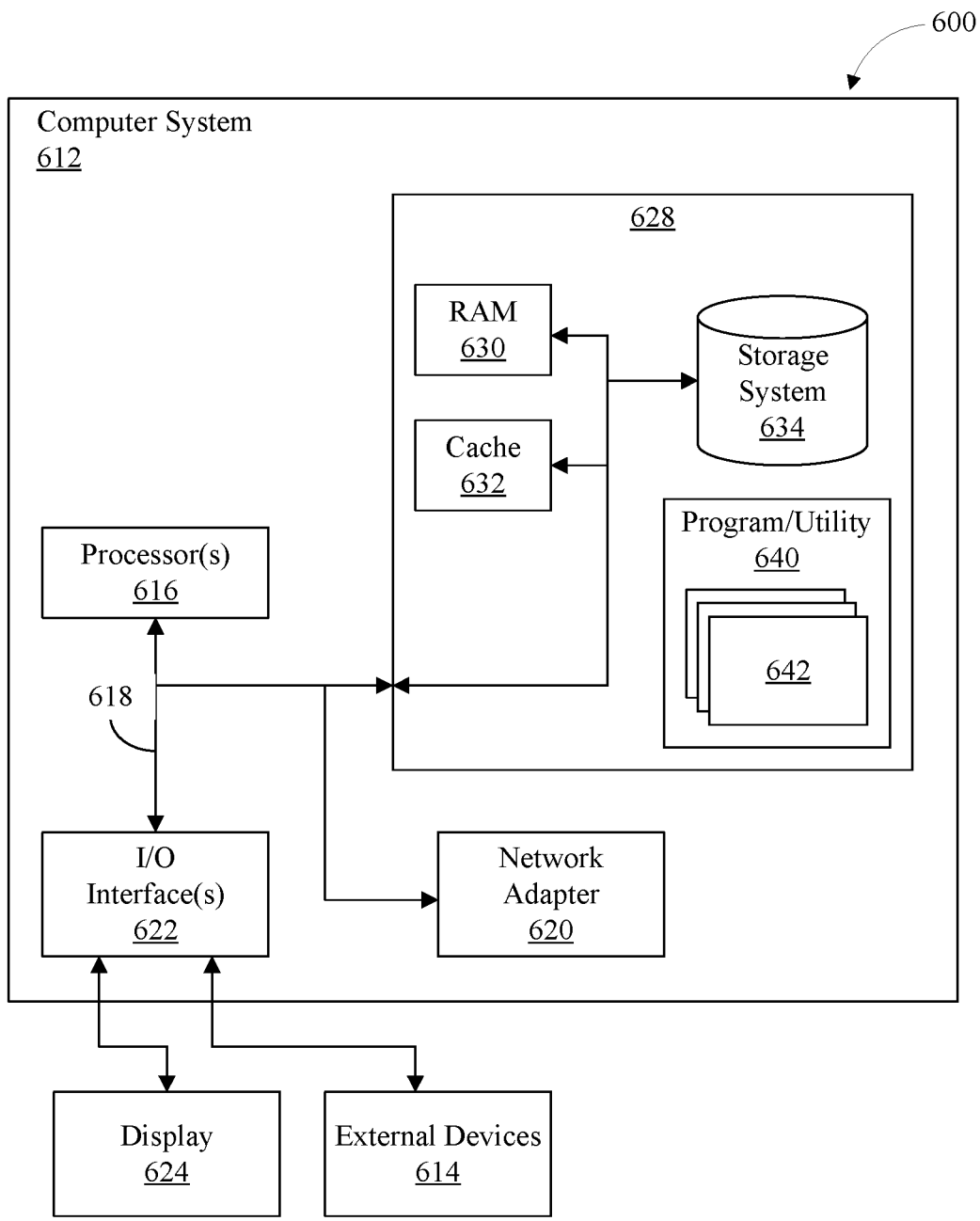
FIG. 6 depicts a cloud computing node according to an embodiment.

FIG. 2 depicts lens-focused channel presentation system 200 according to an embodiment. Illustratively, lens-focused channel presentation system 200 includes natural language analyzer 202, message aggregator 204, channel state determiner 206, topic-specific lens selector 208, and lens-focused channel generator 210. Natural language analyzer 202, message aggregator 204, channel state determiner 206, topic-specific lens selector 208, and lens-focused channel generator 210, in certain embodiments, are each implemented in processor-executable instructions that run on one or more processors of an electronic device, such as processor(s) 616 of computer system 612 (FIG. 6). In other embodiments, one or more of natural language analyzer 202, message aggregator 204, channel state determiner 206, topic-specific lens selector 208, and lens-focused channel generator 210 can be implemented in dedicated circuitry or a combination of circuitry and processor-executable instructions.

Lens-focused channel presentation system 200 can continually or intermittently monitor message exchanges over a messaging platform on behalf of a single user or a group of users. Messages can be archived in a datastore and marked with a conversation-id, time stamp, and/or conversation completion time by lens-focused channel presentation system 200.

Natural language analyzer 202 can implement machine learning, including natural language processing (NLP), to identify and classify messages occurring within one or more channels. Messages can be classified by natural language analyzer 202 according to topics, themes, concepts, and/or categories using machine learning. Using NLP, natural language analyzer 202 can perform semantic analysis of information contained in a communication comprising text. NLP is a field of computer science, artificial intelligence and linguistics that implements computer processes for performing machine-based recognition of human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis implemented with a computer can be used to construct meaning representations, semantic specification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by natural language analyzer 202 to implement NLP and semantic analysis.

Using NLP and machine learning, natural language analyzer 202 can determine themes, topics and/or concepts and can classify communications by identifying word patterns that differ only in grammatical structure or style, but whose substantive content expresses the same or closely similar thoughts or sentiments. In one embodiment, the NLP performed by natural language classifier analyzes the text of communications using a lemmatizer, a natural language processing technique that performs morphological analysis to identify the lemmas of distinct words in a conversation text. A lemma is the base or dictionary form of a word. For example, implementing a lemmatization, NLP treats a word such as "saw" as either "see" or "saw" depending on whether the word is used in the document as a verb or a noun, which can be determined by NLP using parts-of-speech tagging.

In another embodiment, the NLP performed uses a stemming procedure to reduce inflectional forms and derivationally related forms of words in the text of communications. Stemming typically requires less information than lemmatizing (which relies on a vocabulary and morphological analysis to lemmatize words), but is a less refined, more heuristic process that identifies the roots of words by eliminating word endings or derivational affixes of the words. The NLP performed by natural language analyzer 202, in various embodiments, can implement different stemming algorithms, such as the Porter stemmer (which consists of five, sequentially applied phases of word reductions), Lovin stemmer, or Paice stemmer.

The capability of lens-focused channel presentation system 200 to identify word patterns that differ only in grammatical structure or by virtue of stylistic differences enables the system to treat messages that convey the same thought or sentiment as equivalent in identifying word patterns.

In one embodiment, natural language analyzer 202 uses a deep learning neural network to learn word vector representations through natural language models. Word vectors, wherein words are projected from a sparse 1-of-V encoding (V being the size of a predetermined vocabulary) onto a lower dimensional vector space via a hidden layer, are essentially feature extractors that encode semantic features of words. The dense representation of words that are close, either in a Euclidean or cosine distance sense, are thus semantically close or similar in the lower dimensional vector space. The deep learning neural network is but one of the different types of machine learning that can be implemented by natural language analyzer 202. In other embodiments, natural language analyzer 202 can implement other types of machine learning.

In an embodiment, natural language classifier can implement a convolutional neural network (CNN) comprising layers with convolving filters for identifying word patterns based on a dense representation of words. Using a CNN, natural language analyzer 202 can be trained to recognize word patterns occurring in a conversation and to classify the message according to concept, category, topic, or theme, for example.

In other embodiments, natural language analyzer 202 uses probabilistic topic modeling (e.g., latent Dirichlet allocation, bi-term topic model) to identify topics messages. For example, given a specific number of topics, latent Dirichlet allocation (LDA) assigns a topic to each word in a collection of messages and extracts topics based on the number of words of each topic present in each message. LDA is a generative probabilistic, three-level hierarchical Bayesian model for analyzing discrete data such as text corpora. Each item of a collection (e.g., text corpus) is modeled as a finite mixture over an underlying set of topics, and each topic is modeled as an infinite mixture over an underlying set of topic probabilities. Accordingly, a messages corpora, as with other text corpora, can be analyzed by natural language analyzer 202 using LDA to identify topics and extract topical indicia from the collected messages. In other embodiments, natural language analyzer 202 can implement other types of machine learning to determine context and/or topics of a conversation.

In certain embodiments, lens-focused channel presentation system 200 operatively couples with an external natural language classifier (e.g., Watson™ Natural Language Classifier) to identify topics or concepts within messages and classify messages accordingly. More generally, the identifying and classifying can be performed using an artificial intelligence (AI) service provided by an AI system. One such AI system is the Watson™ system that is available from the International Business Machines (IBM) Corporation of Armonk, N.Y.

Because messages within a single channel can span multiple topics and messages across multiple channels can pertain to the same or related topics, message aggregator 204 groups messages based on similarity of topic. Message aggregator 204 can implement a clustering technique or algorithm (e.g., k-means clustering) for recognizing word patterns (e.g., individual words, phrases, sentences) to group messages according to topic. Message text, representing distinct objects, can be grouped into clusters or groups such that sufficiently similar patterns are partitioned into the same cluster or group. Based on the specific word pattern, a word pattern of conversation text can be clustered using k-means clustering into one of k classes. The mean inter- and intra-class distances of word patterns in text are determined, and word patterns (as distinct objects) are moved iteratively from one cluster to another such that each move improves the value of a pre-selected criterion function. Each cluster can comprise word patterns corresponding to a message topic, generating a group of topic-specific messages based on similarity of topic.

Moreover, topic-specific messages can include messages that cover two or more topics that share a relationship with one another. Message aggregator 204 can recognize and federate messages that repeatedly include such related topics. As defined herein, to "federate" is to group or combine multiple objects. In the specific context of federating messages as described herein, multiple messages relating to a specific topic are federated by identifying messages based on a message topic, extracting the messages from one or more channels, and presenting the messages in a single topic-specific channel. For example, a collaboration team communicating over the same or multiple channels may exchange messages concerning a Java-implementation of system that the team is developing. Because the messages frequently refer not only to the system itself but Java as well, message aggregator 204 can search across channels to identify, extract, and federate messages that relate specifically to either topic. Message aggregator 204 can also cluster messages based on topics identified from user input. Based on the user input natural language analyzer 202 can identify topic-specific messages, and message aggregator 204 can federate topic-specific messages extracted from one or more channels.

Optionally, lens-focused channel presentation system 200 also can include a tone analyzer (not shown) that predicts the sentiment or tone of a message based on the text of the message. The tone analyzer, using linguistic analysis, initially parses a textual rendering of a message into sentences and tokens. Nouns, verbs, and other parts of speech are identified by the tone analyzer using parts-of-speech tagging once the textual rendering is parsed into sentences and tokens. The tone analyzer determines the internal structure and meaning of the textual rendering (e.g., entities, purpose, and the like) by breaking the sentences into labeled phrases, including ones identified by the tone analyzer as specific sentiments (e.g., joy, fear, sadness, anger, frustration, excitement) and/or tones (e.g., analytical, confident, tentative). A machine learning model can train the tone analyzer to predict tones based on several categories of features including n-gram features, lexical features from different dictionaries, punctuation, and second-person references. The machine learning model, in one embodiment, can comprise a Support Vector Machine (SVM).

The role of channel state determiner 206 is to determine the state of a channel. The state of a channel determines whether topic-specific lens selector 208 is invoked and whether a lens-based channel is generated. A state can correspond to a single user or multiple users. The state of a channel can depend on one or more factors. For example, the state can correspond to the number of messages conveyed over the channel or the rate that the messages flow through the channel. The state can depend on the urgency or intensity associated with one or more topics of the messages over the channel, for example. The state, for example, can depend on the tone of one or more messages conveyed over the channel. The state of the channel thus can indicate any of various predetermined conditions, including the examples described herein, that invoke the operations of lens-focused channel presentation system 200.

In certain embodiments, a user or a group of users can specify one or more metrics used by channel state determiner 206 to determine the state of a channel. A condition can be specified by the user or group of users such that topic-specific lens selector 208 and/or lens-focused channel generator 210 is invoked and that a lens-based channel is generated if the condition is not satisfied. In other embodiments, lens-focused channel presentation system 200, independently of user input, can determine the condition or conditions that must be satisfied based on past patterns of messaging over the channel.

An example of a condition-determining metric used by channel state determiner 206 is message velocity. As defined herein, "message velocity" is the number of messages over a channel per unit time (e.g., hour(s), day, week, and so forth). Another example of a condition-determining metric used by channel state determiner 206 is topic intensity. As defined herein, "topic intensity" corresponds to the number of messages over one or more channels per unit time that pertain to a specific topic. Still another example is message volume. As defined herein, "message volume" is a number of messages classified according to a message status as of a specific time. The status of a message can be read versus unread, for example. Another status, for example, is responded to versus not responded to. More generally, the status of a message can be acted or unacted on.

Using a condition-determining metric, channel state determiner 206 can invoke operations of topic-specific lens selector 208 and/or lens-focused channel generator 210 under certain conditions. Message volume, for example, can be used in the not infrequent situation in which an individual user has been unable to access or interact via one or more channels for an extended time (e.g., while on vacation). Lens-focused channel presentation system 200, in certain embodiments, can measure the times between a user's receipt of messages and the user's reading or responding to the messages. Lens-focused channel presentation system 200 can determine based on the measures an average read-in time or response time. Given a message volume, channel state determiner 206 can determine that the state of the channel is such that only a certain portion of the message volume can be read and/or responded to within the average amount of time the user devotes to messages. If the portion is less than a predetermined threshold (e.g., specified by the user), channel state determiner 206 based on the determined state invokes topic-specific lens selector 208 and/or lens-focused channel generator 210.

Message velocity can be used, for example, to temper the impact of a surge in messages over one or more channels.

Again, lens-focused channel presentation system 200 can determine based on a user's past pattern of messaging over one or more channels an average read-in time or response time for an average message velocity. Given the surge in messages over one or more channels, channel state determiner 206 can determine that the user is likely to read and/or respond to only a portion (less than a predetermined threshold) of the messages and, in response, can invoke operations of topic-specific lens selector 208 and/or lens-focused channel generator 210.

Topic intensity can be used, for example, to alert a user or group of users that one or more topics across one or more channels warrants specific attention. For example, in the example context of a collaboration team collaborating on system development, a topic or topics appearing in messages with high frequency can alert the team to a problem or issue that requires resolution. The operations of topic-specific lens selector 208 and/or lens-focused channel generator 210 are invoked in response to the state of the channel determined by channel state determiner 206.

Once invoked, topic-specific lens selector 208 operates to select a topic-specific lens based on the channel state. For example, in response to a high message volume or message velocity surge, topic-specific lens selector 208 can select a lens for generating a channel comprising the n (n≥1) topics based on intensity of the topics occurring with messages over one or more channels. In certain embodiments, n can be selected based on past patterns of messaging such that the number of messages corresponding to the n topics are likely to be read and/or responded to within a predetermined time. In response to a topic intensity, for example, topic-specific lens selector 208 can select a lens for generating a channel comprising the high-intensity topic or topics. The n topics can be those identified as the most important or significant topics. The importance or significance of a topic can be predetermined based on user input or, as described below, based on a natural language analysis of messages of a user or group of users.

Thus, a topic-specific lens selected by topic-specific lens selector 208 can be a preconfigured lens corresponding to one or more topics identified by a user as significant or important. The user can be an owner or manager a channel or specific topic. As defined herein, "owner" and "manager" are defined as an individual member of a group (e.g., collaboration team) jointly associated with a channel or topic who by the consent of the group is assigned responsibility for managing the channel or topic.

Operatively, lens-focused channel generator 210 configures a lens-focused channel that is presented to the user or group of users. The lens-focused channel can correspond to the specific lens selected by topic-specific lens selector 208, as described, and thus the lens focuses on one or more specific topics. The topics, as noted above, corresponding to important or significant topics.

Alternatively, lens-focused channel generator 210 can configure the lens-focused channel based on natural language processing of messages exchanged over one or more channels. Using a natural language classifier, as described above, one or more lenses can be generated from messages exchanged between a discussion group, chat group, collaboration team, or other group of users. In certain embodiments, lens-focused channel generator 210 implements one or more clustering algorithms to generate lenses for an individual user or group of users by normalizing natural language and creating associations between the natural language topics and/or user(s). For example, language such as "topic A is important" or "we need to address issue B" or the like can identify topic A or B as important or significant. Lens-focused channel generator 210 can use the lens for extracting messages relating topic A or B from one or more channels. Whether based on a selected preconfigured lens or one generated based on natural language processing, a lens-focused channel generated by lens-focused channel generator 210 comprises messages extracted from one or more other channels, the extracted messages identified and grouped based on the specific topic or topics determined to be important or significant.

The lens-focused channel is presented by lens-focused presentation system 200 as a distinct channel on a data communications network to one or more users. As presented the lens-focused channel extracts from one or more channels messages explicitly related to the one or more specific topics identified, free from extraneous messages, and federates the topic-specific messages for presentment to a user or group of users. Optionally, lens-focused presentation system 200 can limit presentation of the lens-focused channel until a change in the state of a channel is detected (e.g., surge in message velocity recedes below a predetermined threshold amount, volume of unacted on messages diminishes, topic intensity dissipates). Lens-focused presentation system 200, optionally, can reset the lens after a predetermined time period. Different lens-focused channels can be generated for different members of a group or a subset of members of a group.

In certain embodiments, lens-focused presentation system 200 can poll a group of users regarding a lens-focused channel presentment to the group of users. The poll can request user responses and if the responses indicate that a predetermined portion of the group of users were not helped by the lens-focused channel, the topic-specific lens used to generate the lens-focused channel can be modified. Accordingly, in future situations in which the same state of the channel is encountered, the modified version of the topic-specific lens can be selected by topic-specific lens selector 208 and used by lens-focused channel generator 210 to generate a modified lens-focused channel. The group of users may choose to modify the topic-specific lens based on the categories and concepts included in the lens-focus. For example, the group of users may be sent a survey of the lens effectiveness in the channel presentation, based on which, the lens is determined to be ineffective. The survey may further poll users for natural language extensions, based on which, lens-focused presentation system 200 modifies the lens to better classify the capture and/or expand the scope of the lens.

In other embodiments, lens-focused presentation system 200 can initiate a corresponding workflow. The workflow can be used to sort an active conversation regarding multiple topics into distinct channels. For example, with respect to a conversation on one channel regarding a project being worked on by a collaboration team, the workflow can be used to create different topic-specific lens for creating separate channels for separate topics pertaining to the project. For instance, a manager of a technical support team may be involved in multiple channels when a certain customer enters a technical support ticket that launches a triage and repair session with respect to the customer. Lens-focused presentation system 200 modifies the manager's support team channels for those support team members involved to create a topic-specific lens for each channel in which the customer is discussed. The lens-focused presentation system 200 thus focuses those support team members involved on specific issues relevant to the customer, and the workflow is maintained until the triage workflow is complete.

FIG. 3 is a flowchart of example method 300 for creating a lens-focused channel according to an embodiment. Method 300 can be performed by a system or systems the same or similar to those described with reference to FIGS. 1 and 2. The system at block 302 determines a state of a channel hosted on a data communications network. If the state of the channel indicates a predetermined condition at block 304, the system at block 306 in response to the predetermined condition configures a topic-specific lens for federating multiple topic-specific messages conveyed over the data communications network. At block 308, the system generates a lens-focused channel for presenting the federated topic-specific messages to a user over the data communications network.

In certain embodiments, each of the topic-specific messages pertain to one or more topics identified by a natural language classifier. The configuring at block 306 can be based on a message velocity, a message volume, and/or a topic intensity. The federating can be based on extracting topic-specific messages from multiple different channels on the data communications network.

In other embodiments, the topic-specific lens comprises multiple topic-specific lenses. The selecting then comprises selecting each of the topic-specific lenses based on different topics, each of which is uniquely associated with one of the topic-specific lenses.

In still other embodiments, the system polls a group of users regarding the lens-focused channel. Based on the polling, the system can modify the topic-specific lens. The poll can request user responses regarding the specific topic or topics presented in the lens-focused channel. If the users' subjective responses to the poll indicate that a predetermined portion of the group of users were not better able to focus on one or more topics through generation of the lens-focused channel, the system can modify the topic-specific lens used to generate the lens-focused channel. The responses can indicate which lens-focused channels would be useful in which circumstances and can be used to modify the topic-specific lens such that, in future situations in which the same state of the channel is encountered, the modified version of the topic-specific lens is used to generate a modified lens-focused channel. A topic-specific lens modification may be based on negative responses to polling, indicating a need for the modification. However, positive poll responses may re-enforce a specific lens type, and moreover, may boost specific words in a future lens generation.

In yet other embodiments, the system also initiates a workflow based on topic-specific lens. The system can sort an active conversation regarding multiple topics into distinct channels based on the workflow.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
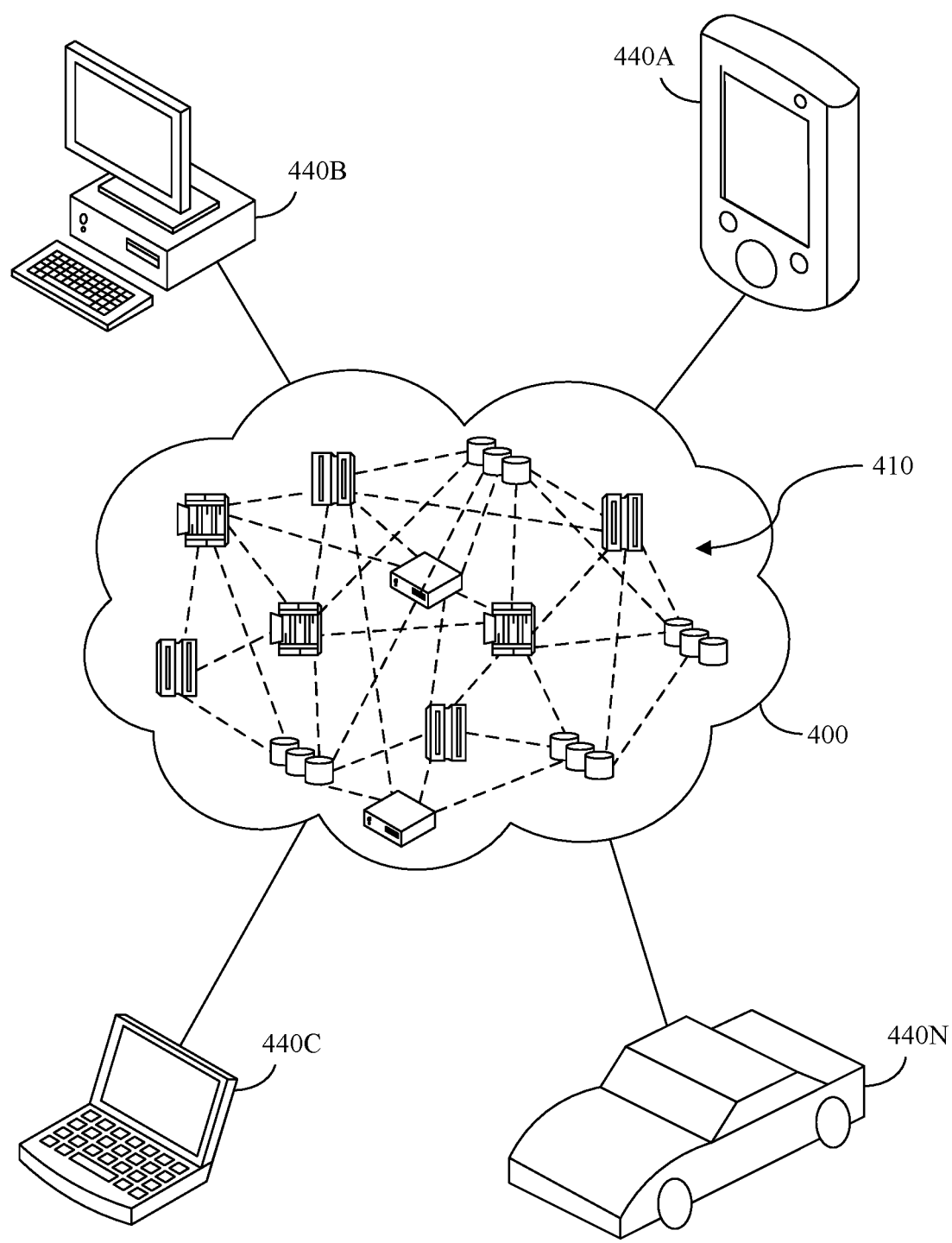
FIG. 4 depicts a cloud computing environment according to an embodiment.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 440a, desktop computer 440b, laptop computer 440c, and/or automobile computer system 440n may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 44a-n shown in FIG. 4 are intended to be illustrative only and that computing nodes 410 and cloud computing environment 400 can communicate with any type of computerized device over any type of network and/or network addressable connection (e.g., using a web browser).

Figure 5:
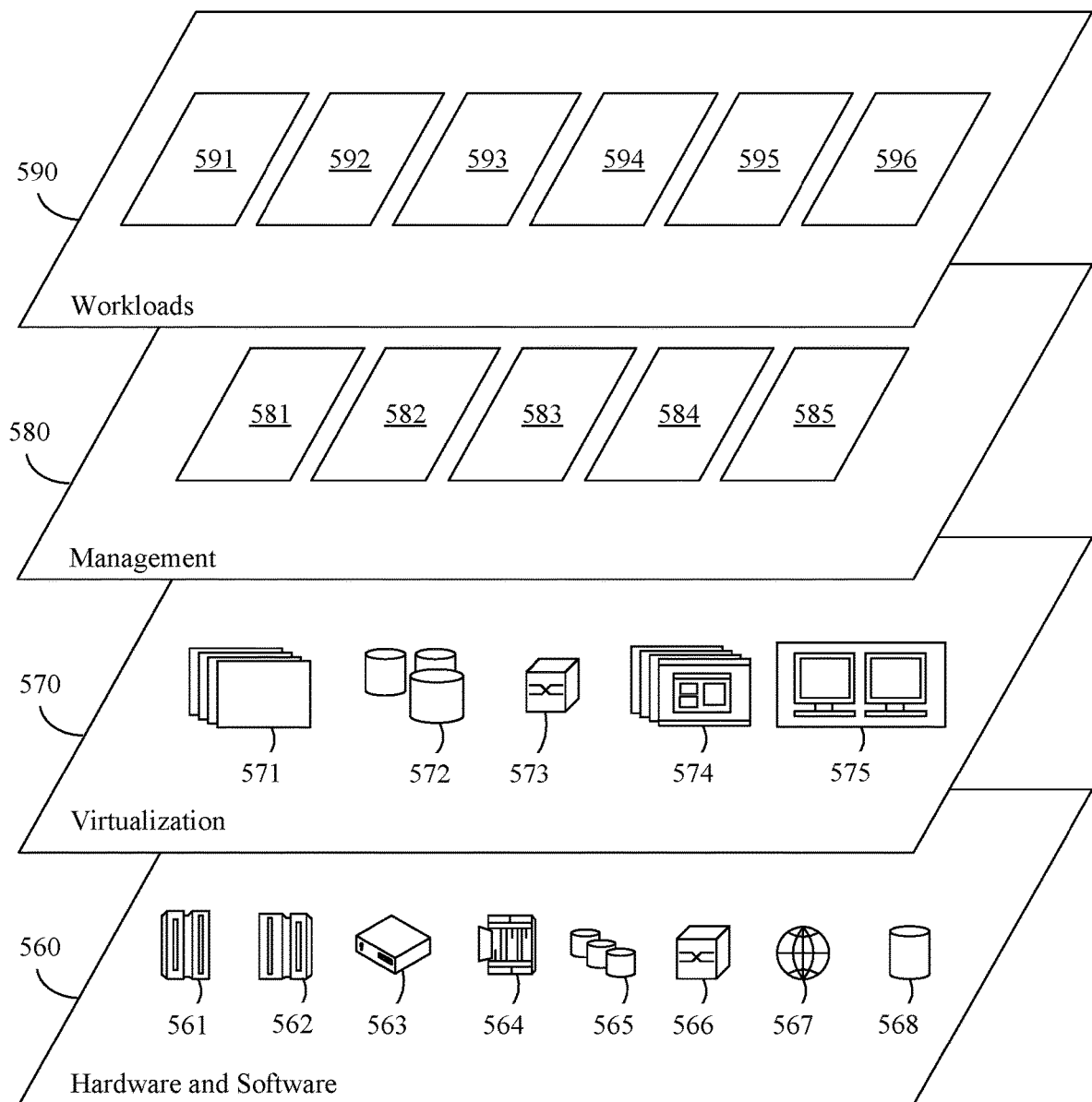
FIG. 5 depicts abstraction model layers according to an embodiment.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA. Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and lens-focused channel presentation system 596.

FIG. 6 illustrates a schematic of an example of a computing node 600. In one or more embodiments, computing node 600 is an example of a suitable cloud computing node. Computing node 600 is not intended to suggest any limitation as to the scope of use or functionality of embodiments of the invention described herein. Computing node 600 is capable of performing any of the functionality described within this disclosure.

Computing node 600 includes a computer system 612, which is operational with numerous other general-purpose or special-purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors 616, a memory 628, and a bus 618 that couples various system components including memory 628 to processor(s) 616. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 618 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 612 typically includes a variety of computer system-readable media. Such media may be any available media that is accessible by computer system 612, and may include both volatile and non-volatile media, removable and non-removable media.

Memory 628 may include computer system readable media in the form of volatile memory, such as random-access memory (RAM) 630 and/or cache memory 632. Computer system 612 may further include other removable/non-removable, volatile/non-volatile computer system storage media. By way of example, storage system 634 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. For example, one or more of the program modules may include lens-focused channel presentation system 696 or portions thereof.

Program/utility 640 is executable by processor(s) 616. Program/utility 640 and any data items used, generated, and/or operated upon by computer system 612 are functional data structures that impart functionality when employed by computer system 612. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via input/output (I/O) interfaces 622. Still, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

While computing node 600 is used to illustrate an example of a cloud computing node, it should be appreciated that a computer system using an architecture the same as or similar to that described in connection with FIG. 6 may be used in a non-cloud computing implementation to perform the various operations described herein. In this regard, the example embodiments described herein are not intended to be limited to a cloud computing environment. Computing node 600 is an example of a data processing system. As defined herein, "data processing system" means one or more hardware systems configured to process data, each hardware system including at least one processor programmed to initiate operations and memory.

Computing node 600 is an example of computer hardware. Computing node 600 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 600 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, the phrases "in response to" and "responsive to" means responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" refer to human beings. Likewise, as defined herein "users" and "individuals" refer to human beings.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining a tone of at least one of a plurality of topic-specific messages, conveyed over a data communications network, based on text of the at least one of the plurality of topic-specific messages;
    determining, with computer hardware, a state of a channel hosted on the data communications network based, at least in part, on the determined tone of the at least one of the plurality of topic-specific messages;
    configuring a topic-specific lens for federating the plurality of topic-specific messages conveyed over the data communications network in response to a predetermined condition indicated by the state of the channel;
    polling a group of users and modifying the topic-specific lens based on the polling;
    generating a lens-focused channel for presenting the plurality of topic-specific messages, as federated by the topic-specific lens, to a user over the data communications network; and
    initiating a workflow based on the topic-specific lens, the workflow creating different topic-specific lens for creating separate channels for separate topics pertaining to a project.

2. The method of claim 1, wherein each of the plurality of topic-specific messages pertain to at least one topic identified by a natural language classifier.

3. The method of claim 1, wherein the configuring is based on at least one of a message velocity, message volume, or topic intensity.

4. The method of claim 1, wherein the federating is based on extracting topic-specific messages from a plurality of channels on the data communications network.

5. The method of claim 1, wherein the topic-specific lens comprises a plurality of topic-specific lenses, the method further comprising:
    selecting each of the plurality of topic-specific lenses based on different topics each uniquely associated with one of the plurality of topic-specific lenses.

6. A system, comprising:
    a processor configured to initiate operations including:
        determining a tone of at least one of a plurality of topic-specific messages, conveyed over a data communications network, based on text of the at least one of the plurality of topic-specific messages;
        determining a state of a channel hosted on the data communications network based, at least in part, on the determined tone of the at least one of the plurality of topic-specific messages;
        configuring a topic-specific lens for federating the plurality of topic-specific messages conveyed over the data communications network in response to a predetermined condition indicated by the state of the channel;
        polling a group of users and modifying the topic-specific lens based on the polling;
        generating a lens-focused channel for presenting the plurality of topic-specific messages, as federated by the topic-specific lens, to a user over the data communications network; and
        initiating a workflow based on the topic-specific lens, the workflow creating different topic-specific lens for creating separate channels for separate topics pertaining to a project.

7. The system of claim 6, wherein each of the plurality of topic-specific messages pertain to at least one topic identified by a natural language classifier.

8. The system of claim 6, wherein the configuring is based on at least one of a message velocity, message volume, or topic intensity.

9. The system of claim 6, wherein the federating is based on extracting topic-specific messages from a plurality of channels on the data communications network.

10. The system of claim 6, wherein the topic-specific lens comprises a plurality of topic-specific lenses, wherein the processor is configured to initiate operations further including:
selecting each of the plurality of topic-specific lenses based on different topics each uniquely associated with one of the plurality of topic-specific lenses.

11. A computer program product, the computer program product comprising:
one or more computer-readable storage mediums and program instructions collectively stored on the one or more computer-readable storage mediums, the program instructions executable by a processor to cause the processor to initiate operations including:
determining a tone of at least one of a plurality of topic-specific messages, conveyed over a data communications network, based on text of the at least one of the plurality of topic-specific messages;
determining a state of a channel hosted on the data communications network based, at least in part, on the determined tone of the at least one of the plurality of topic-specific message;
configuring a topic-specific lens for federating the plurality of topic-specific messages conveyed over the data communications network in response to a predetermined condition indicated by the state of the channel;
polling a group of users and modifying the topic-specific lens based on the polling;
generating a lens-focused channel for presenting the plurality of topic-specific messages, as federated by the topic-specific lens, to a user over the data communications network; and
initiating a workflow based on the topic-specific lens, the workflow creating different topic-specific lens for creating separate channels for separate topics pertaining to a project.

12. The computer program product of claim 11, wherein each of the plurality of topic-specific messages pertain to at least one topic identified by a natural language classifier.

13. The computer program product of claim 11, wherein the configuring is based on at least one of a message velocity, message volume, or topic intensity.

14. The computer program product of claim 11, wherein the federating is based on extracting topic-specific messages from a plurality of channels on the data communications network.

15. The computer program product of claim 11, wherein the topic-specific lens comprises a plurality of topic-specific lenses, wherein the operations further include:
selecting each of the plurality of topic-specific lenses based on different topics each uniquely associated with one of the plurality of topic-specific lenses.

* * * * *